United States Patent [19]

Tribe et al.

[11] Patent Number: 5,061,932
[45] Date of Patent: Oct. 29, 1991

[54] ROAD SURFACE SENSING SYSTEM FOR A VEHICLE

[75] Inventors: Raglan H. A. H. Tribe, Solihull; Neil G. Thomson, Shirley, both of Great Britain

[73] Assignee: Lucas Industries public limited company, Birmingham, England

[21] Appl. No.: 562,923

[22] Filed: Aug. 6, 1990

[30] Foreign Application Priority Data

Aug. 10, 1989 [GB] United Kingdom ............... 8918306

[51] Int. Cl.$^5$ .................... G01S 13/60; G01B 5/28
[52] U.S. Cl. ................................. 342/70; 73/105; 342/71
[58] Field of Search ............................ 342/70–72, 342/104; 73/105, 146

[56] References Cited

U.S. PATENT DOCUMENTS

| 3,617,993 | 11/1971 | Massie et al. | 342/104 X |
| 3,618,084 | 11/1971 | Balsiger et al. | 342/104 X |
| 3,720,818 | 3/1973 | Spragg et al. | 73/105 X |
| 4,148,027 | 4/1979 | Nowogrodzki | 342/104 |
| 4,354,191 | 10/1982 | Matsumura et al. | 342/104 X |
| 4,913,482 | 4/1990 | Hanai et al. | 296/65.1 |

*Primary Examiner*—Gilberto Barrón, Jr.
*Attorney, Agent, or Firm*—Nixon & Vanderhye

[57] ABSTRACT

A system for sensing road irregularities from a vehicle modifies an operational system of the vehicle, such as a suspension system, according to the type and severity of the sensed irregularity. The system employs a Doppler Microwave radar sensor arranged to project radiation at a road surface ahead of the vehicle and includes means for detecting radiation reflections of which the carrier frequency is amplitude modulated according to the surface irregularities. An electronic circuit differentiates the modulated signal to produce a control signal representative of said surface condition and a controller receives said signal and modifies the operation of the vehicle system in response thereto.

5 Claims, 4 Drawing Sheets

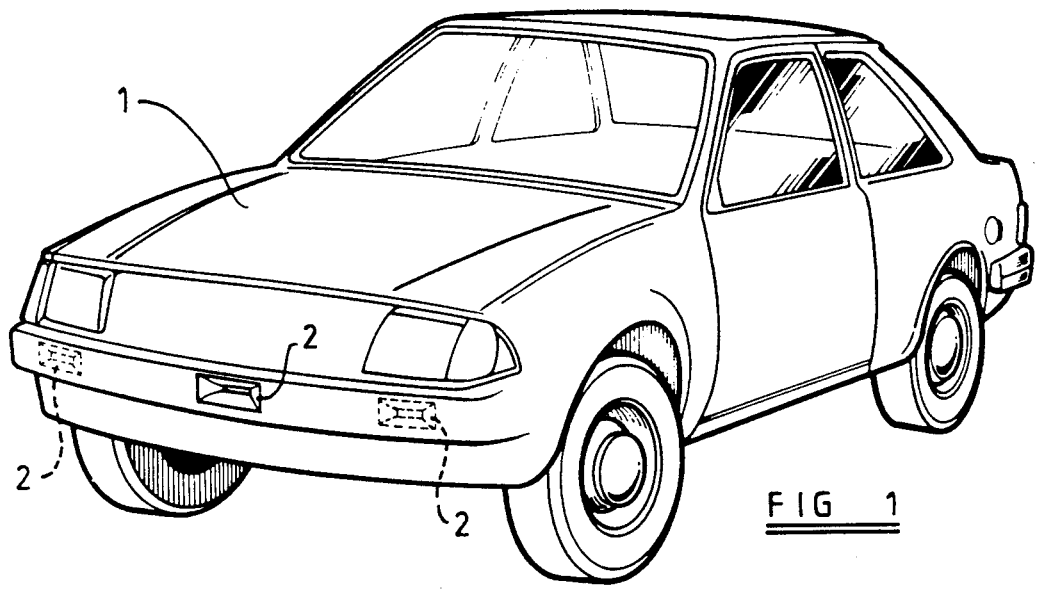
Microwave horn / Alternatively one over each wheel.
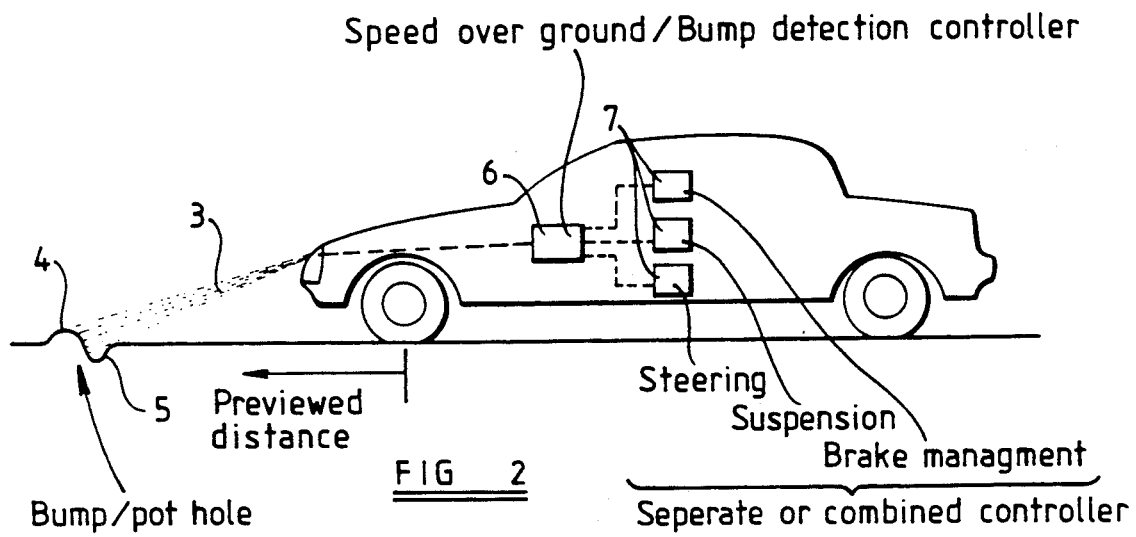

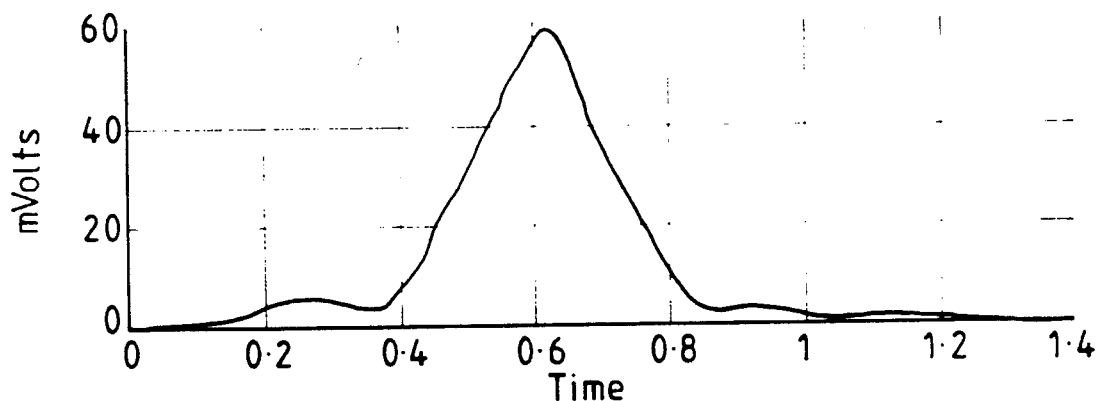
FIG 5a
3rd order Butterworth 5Hz cut-off
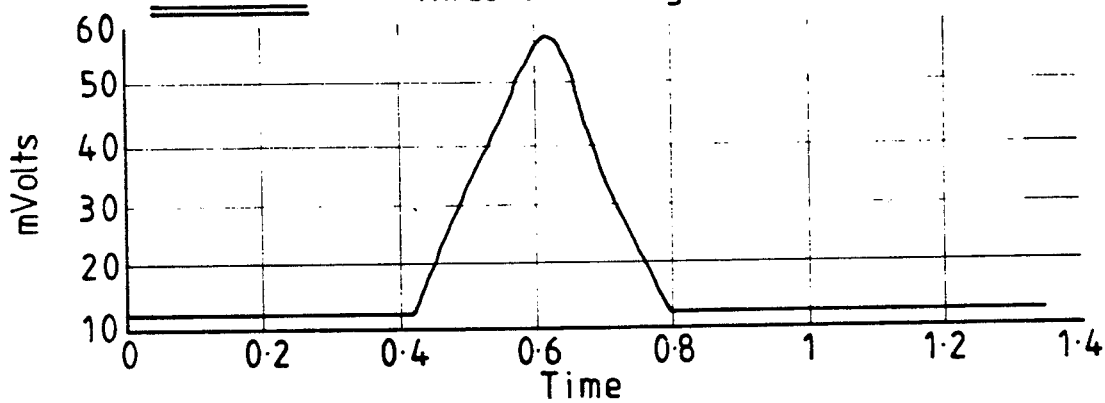
FIG 5b Thresholded signal
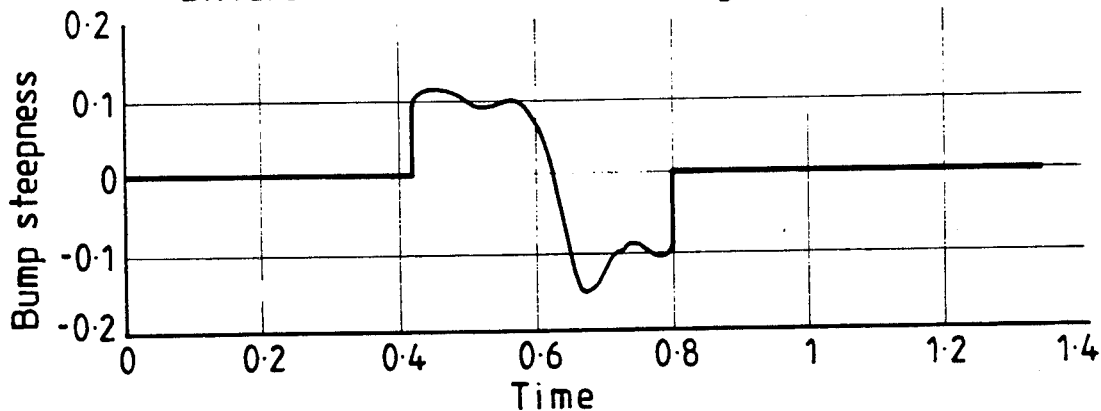
Differentiated thresholded signal
FIG 5c

5,061,932

ROAD SURFACE SENSING SYSTEM FOR A VEHICLE

BACKGROUND OF THE INVENTION

1. Field of the Invention

This invention relates to a system for sensing the irregularities, such as bumps and pot holes, in a road surface and modifying an operational system of the vehicle, such as the suspension system, and thereby the running performance of the vehicle, according to the type and severity of the sensed irregularity.

2. Discussing of Prior Art

In one known road surface sensing proposal, described in U.S. Pat. No. 4,781,465, the road surface is scanned by directing a light beam onto the surface at a predetermined distance ahead of the vehicle and monitoring the distance travelled by the reflected light to produce a signal used for suspension adjustment. The operation of such a system can be seriously disturbed by the effect of spurious reflections and the preventive and corrective expedients necessary to deal with such problems further increase the manufacturing costs of an already inherently expensive system.

In another known system, described in U.S. Pat. No. 4,225,950, ultrasonic sound emissions are directed onto a road surface and reflected signals are used to influence vehicle performance. The ultrasonic sound signals are, however, very susceptible to degradation by air turbulence and such systems are therefore considered to be unreliable.

It has also been proposed to use radar to measure variations in the distance between the underside of a vehicle and road surface thereunder and to produce corresponding control signals. However, such a system does not provide sufficient response time to enable the controlled equipment on the vehicle to modify the vehicle performance in a satisfactory manner.

SUMMARY OF THE INVENTION

An object of the invention is to provide a road surface sensing system for a vehicle which is simple and cheap to manufacture and operates more effectively that some conventional systems.

According to the invention, a road surface sensing system for a vehicle comprises a transmitter for projecting electromagnetic radiation at a road surface ahead of a vehicle, a receiver for detecting radiation whose carrier is amplitude modulated according to irregularities of the surface, means for differentiating the modulation signal to produce a control signal representative of the road surface condition, and a vehicle system controller arranged to receive the control signal and to modify operation of the vehicle system in response to the control signal.

Preferably the transmitter is arranged to emit microwave radiation.

Preferably the modulated signal is fed to a low pass filter stage to eliminate system noise prior to differentiation thereof.

BRIEF DESCRIPTION OF THE DRAWINGS

The invention will now be described, by way of example, with reference to the accompanying drawings in which:

FIG. 1 is a diagrammatic illustration of a vehicle showing part of the equipment of the system of the invention installed thereon;

FIG. 2 is a diagrammatic side elevation of the vehicle of FIG. 1, illustrating further details of the system of the invention;

FIG. 5a to 5c illustrate various stages in processing the waveform of FIG. 4b to provide the necessary control signals.

DETAILED DISCUSSION OF PREFERRED EMBODIMENTS

Figure 3:
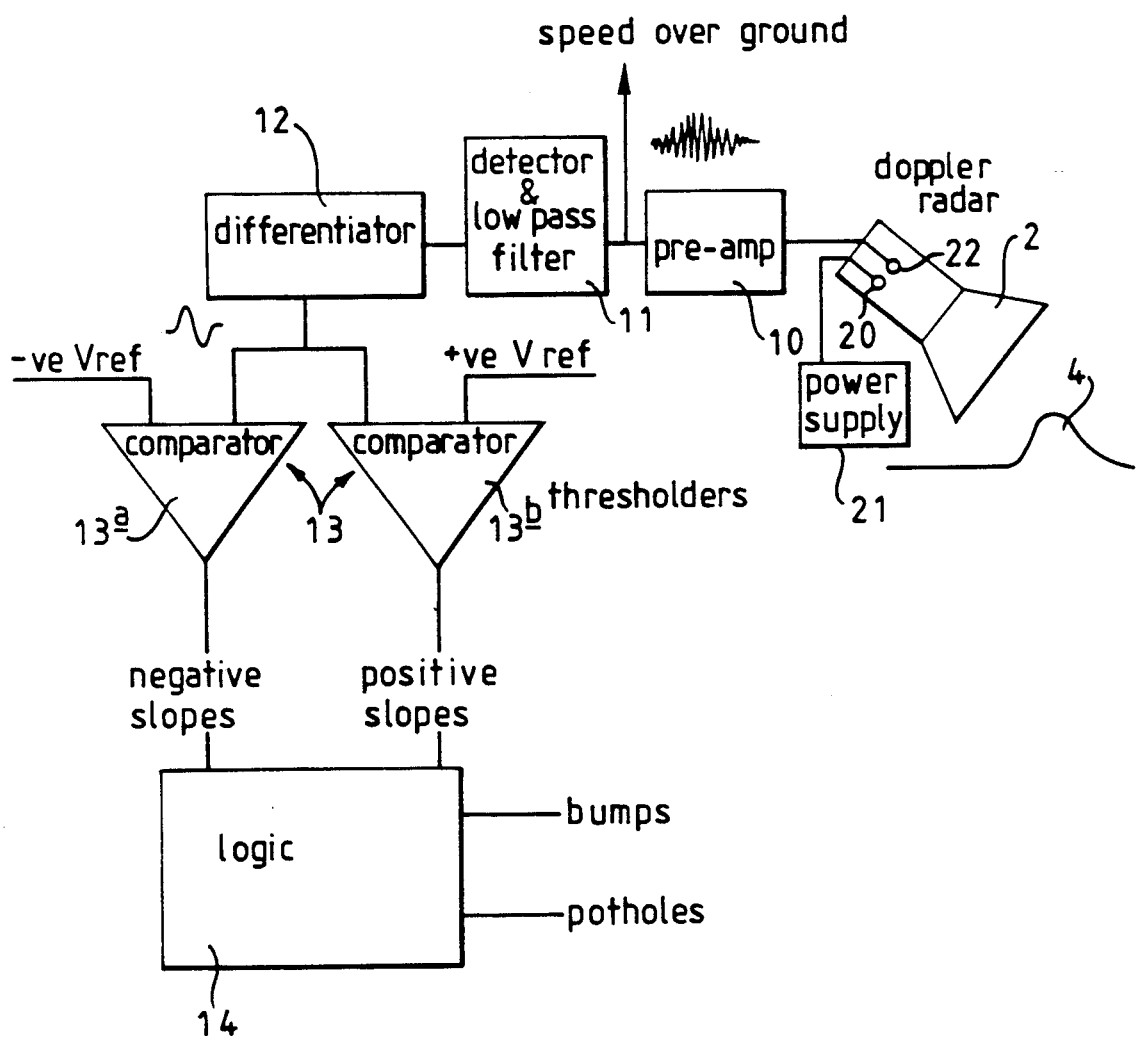
FIG. 3 is a circuit diagram representing the system of the invention.

Referring to FIGS. 1 and 2, these illustrate a vehicle 1 incorporating a Doppler microwave sensor 2 disposed substantially centrally of the front of the vehicle and arranged to direct a radar beam 3 forwardly of the vehicle to impinge upon the road surface at a predetermined distance from the front of the vehicle. The single sensor illustrated would be useful to assess the condition of the road surface generally in front of the vehicle, but it would be preferable to incorporate one or more alternative or additional sensors preferably located in alignment with the respective front wheels of the vehicle so as to assess the road surface condition under each of these wheels. Such sensors are shown in broken lines at 2'. The sensors illustrated are of the microwave horn type, but alternative kinds of sensors, such as planar antennae, may additionally or alternatively be used.

In FIG. 2, the beam 3 is illustrated encountering a bump 4 in the road surface, which is shown in an exaggerated form for the purpose of illustration. A depression or "pot hole 5" is also illustrated and would be detected by the system of the invention. Return signals collected by the sensor are fed to an electronic controller 6, which produces output signals for feeding to one or more system controllers 7 which may be activated to modify the action of vehicle equipment, such as steering, suspension or brake management, according to the severity of the irregularity 4, 5 in the road surface encountered by the vehicle. The controller 6 may conveniently be an existing on-board "speed over ground" controller which may already be incorporated in the vehicle for speed measuring purposes. However, it would be equally possible to incorporate an individual controller to deal with the surface sensing aspect and provide appropriate signals to the vehicle system controllers 7. One example of controlling vehicle performance in response to road surface condition is to adjust the detection threshold of the vehicle brake antiskid system to render that system less sensitive when a rough road surface is encountered. It would also be possible to adjust the stiffness of the vehicle suspension associated with the side of the vehicle which will encounter the oncoming rough surface in the form of bumps and/or pot holes. For example, the suspension may be adjusted so that it will more readily adsorb the increased road roughness and it will also be possible to adjust the vehicle ride height in the event that an excessively large irregularity were encountered. Although it would be possible to use the system of the invention in conjunction with conventional suspension systems, the invention may very advantageously be employed in conjunction with an active suspension system. A further possibility for modifying vehicle performance is to use the system of the invention to control the amount of power steering assistance provided, depending upon the nature of the on-coming road surface.

FIG. 3 illustrates diagrammatically one form of the sensing system of the invention. The Doppler sensor 2 comprises a microwave generator 20 connected to a power supply 21 for generating a microwave carrier signal which is emitted as a narrow beam by the horn. A microwave diode 22 located in the horn receives microwaves reflected from the road surface and from the generator 20, and supplies a detected signal to a pre-amplifier 10. The carrier signal from the sensor 2 is directed at the road surface and provides a carrier frequency which, upon impinging on a bump or pot hole, produces a return signal carrying an amplitude modulation representative of the bump or pot hole profile. The carrier is shifted in frequency by the Doppler effect in accordance with the relative speed between the horn and the ground. The return signal sensed by the sensor is amplified in a pre amplifier 10 and the amplified signal is fed into a "speed-over-ground" circuit for various conventional purposes.

Figure 4A:
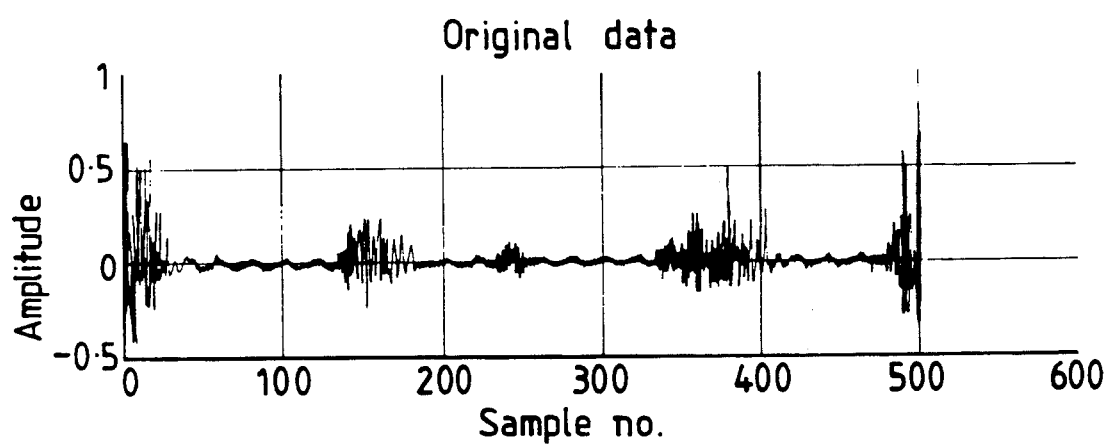
FIGS. 4a and 4b are graphs representing waveforms arising during operation of the system.
Figure 4B:
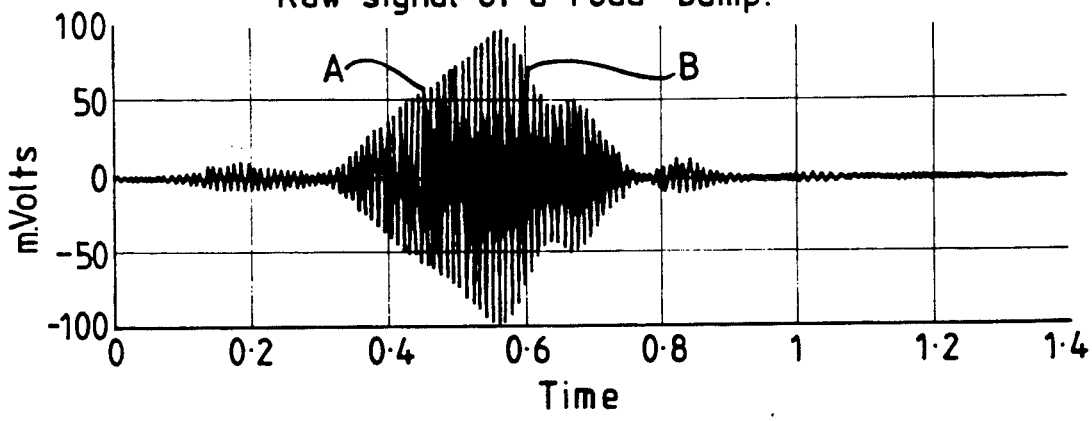

FIG. 4a illustrates a typical signal train produced by the sensor 2 in response to radiation reflected from the sensed road surface and FIG. 4b illustrates, to an enlarged scale, a typical raw signal representing a pronounced bump 4 on the road surface. A detector and low pass filter 11 rectifies the signal of FIG. 4b and eliminates or reduces system noise, leaving a signal carrying the low frequency bump profile characteristic as illustrated in FIG. 5a, and this signal is thresholded to remove minor irregularities, the resulting signal being illustrated in FIG. 5b. The filtered and thresholded signal is then passed to a differentiator circuit 12 where it is differentiated to produce a signal of the kind illustrated in FIG. 5c. This signal carries the characteristic profile slope of either a bump or a pot hole. The typical "bump" signal form of FIG. 4 can be seen to have a rising portion A which is less steep than the falling portion B of the slope and the differentiated signal obtained (FIG. 5c) can be compared with reference information to ascertain whether or not the rising and falling portions of the signal have the correct relationship to indicate detection of a bump.

The signal form resulting from detection by a pot hole will be substantially a mirror image of that in FIG. 4b, with a rising portion A steeper than the falling portion B, giving rise to a correspondingly reversed differentiated signal.

The differentiated signal is fed to a comparator stage respectively 13a, 13b assess the signal, by reference, for example, to a pair of threshold values, to determine whether it represents a bump or a pot hole. These comparators also act as threshold determining means for assessing the severity of the sensed road irregularity. The output from the comparator stage 13 is then fed to a logic stage 14 in which the signals are processed to produce corresponding outputs for supply to the various vehicle system controllers 7 which modify the operation of the corresponding systems so as to obtain the required response in vehicle behavior.

Although the system illustrated in FIG. 3 is shown as an analog system, it may be embodied at least partially as a digital system, for instance in a microprocessor or microcomputer. For instance the functions of the differentiator 12, the comparator stage 13, the logic stage 14, and at least part of the detector and filter 11 may be performed in software by a data processor, which may perform other functions such as speed over ground measurement and control of brake, steering, and suspension operation.

We claim:

1. A road surface sensing system for a vehicle, said system comprising:
   a transmitter for projecting electromagnetic radiation having a carrier at a road surface ahead of a vehicle; and
   a receiver for receiving the electromagnetic radiation reflected by the road surface whereby the carrier of the reflected radiation is amplitude modulated according to irregularities of the road surface, said receiver comprising:
   detection means for detecting an amplitude modulation signal of the carrier of the reflected radiation;
   differentiating means for differentiating the amplitude modulation signal from said detection means and for producing a control signal representative of a road surface condition; and
   vehicle system control means, responsive to the control signal from said differentiating means, for modifying an operating of the vehicle.

2. A system as claimed in claim 1, in which said transmitter is a microwave transmitter.

3. A system as claimed in claim 1, in which said receiver further comprises a low pass filter connected between said detection means and said differentiating means.

4. A system as claimed in claim 1, in which said vehicle system control means includes comparing means for comparing the control signal at least one threshold.

5. A system as claimed in claim 4, in which said comparing means includes discriminating means for discriminating between a positive slope and a negative slope of the amplitude modulation signal.

* * * * *